United States Patent
Lee et al.

(10) Patent No.: US 6,931,197 B1
(45) Date of Patent: Aug. 16, 2005

(54) FREQUENCY MODULATION (FM) RECORDING APPARATUS OF VIDEO TAPE RECORDER

(75) Inventors: Chang-rok Lee, Seoul (KR); Chul-min Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1035 days.

(21) Appl. No.: 09/605,414

(22) Filed: Jun. 28, 2000

(30) Foreign Application Priority Data

Oct. 25, 1999 (KR) .............................. 1999/46360

(51) Int. Cl.$^7$ ............................................. H04N 9/88
(52) U.S. Cl. ............................. 386/2; 386/26; 386/44
(58) Field of Search ........................... 386/1, 9, 21, 26, 386/44, 93, 113, 2; 360/65, 67, 68

(56) References Cited

U.S. PATENT DOCUMENTS

| | | | |
|---|---|---|---|
| 3,947,873 A | 3/1976 | Buchan | |
| 4,556,917 A * | 12/1985 | Shibata et al. | 386/29 |
| 4,641,206 A | 2/1987 | Iwafune | |
| 5,034,823 A | 7/1991 | Geerlings | |
| 5,075,803 A | 12/1991 | Moro et al. | |
| 5,124,807 A * | 6/1992 | Dunlap et al. | 386/39 |
| 5,126,893 A * | 6/1992 | Choi | 360/67 |
| 5,194,963 A | 3/1993 | Dunlap et al. | |
| 5,200,835 A * | 4/1993 | Sakamoto | 386/1 |
| 5,552,895 A | 9/1996 | Kim | |
| 5,598,273 A * | 1/1997 | Kurisaki et al. | 386/9 |
| 5,606,424 A * | 2/1997 | Jung | 386/26 |
| 5,608,531 A * | 3/1997 | Honda et al. | 386/1 |
| RE36,339 E | 10/1999 | Yun et al. | |
| 6,078,720 A * | 6/2000 | Lee et al. | 386/4 |

* cited by examiner

*Primary Examiner*—Huy Nguyen
(74) *Attorney, Agent, or Firm*—Robert E. Bushnell, Esq.

(57) ABSTRACT

A frequency modulation (FM) recording apparatus for recording an FM modulated video signal onto a recording medium is provided. This recording apparatus (luminance components plus color components) includes an automatic gain controller; a limiter for limiting the level of a luminance component output from the automatic gain controller; a recording equalizer for equalizing the output from the limiter in accordance with the characteristics of the recording medium; a color low-pass filter for filtering and transmitting a color FM signal in an FM modulated video signal output from the automatic gain controller; and a mixer for mixing the luminance component output from the recording equalizer with the color component output from the color low-pass filter. The FM recording apparatus adopts an automatic gain controller for correcting an imbalance in the levels of playback FM signals between channels, and enabling FM recording with superior image.

26 Claims, 2 Drawing Sheets

FREQUENCY MODULATION (FM) RECORDING APPARATUS OF VIDEO TAPE RECORDER

CLAIM OF PRIORITY

This application makes reference to, incorporates the same herein, and claims all benefits accruing under 35 U.S.C. §119 from an application entitled Frequency Modulation Recording Apparatus of Video Tape Recorder earlier filed in the Korean Industrial Property Office on 25 Oct. 1999, and there duly assigned Serial No. 99-46360 by that Office.

BACKGROUND OF THE INVENTION

1. Field of the Invention

The present invention relates to a video tape recorder, and more particularly, to a frequency modulation (FM) recording apparatus for recording FM-modulated video signals to video tapes.

2. Description of the Related Art

A video tape recorder performs frequency modulation upon a video signal and then records the frequency modulated video signal. In a double-deck video tape recorder, a signal reproduced in one deck can be recorded in the other deck. In this case, an FM signal reproduced by a header in one deck (henceforth to be referred to as a Playback (PB)-FM signal) is pre-processed and supplied to the other deck. Here, pre-processing involves image enhancement equalizing of the playback frequency modulated signal.

The frequency modulation recording device of a video tape recorder receives a PB-FM signal and generates a recording FM signal (REC-FM signal). The REC-FM signal is recorded after passing through an equalizer and a recording header.

The recording device has a drawback in that the apparatus cannot properly compensate for an imbalance between channels. That is, if there is a difference in the response characteristics of the header of one channel and the header of a second channel, the levels of the signals they reproduce respectively, will be uneven. In addition, there is a problem of noise flowing into the REC-FM signal through the processing steps of the PB-FM signals.

Exemplars of the art, U.S. Pat. No. 5,552,895 for Double-deck Magnetic Recording/Reproducing Apparatus by Kim, U.S. Pat. No. 4,641,206 for Video Signal Recording and Reproducing Apparatus Including a Noise Reduction Circuit issued to Iwafune, U.S. Pat. No. 5,075,803 for Signal Discriminating Device for VTR having Expanded Dynamic Range issued to Moro, et al., U.S. Pat. No. 5,194,963 for Dual Deck Videocassette Recorder System issued to Dunlap, et al., U.S. Patent RE36,339 for Circuit for Tape Duplication in Video Tape Recorder issued to Yun, et al., U.S. Pat. No. 3,947,873 for Method and Circuit for Detecting and Compensating for Drop-out and Distortion of Frequency Modulated Video Signals issued to Buchan, U.S. Pat. No. 5,034,823 for Drop-out Compensation Circuit issued to Geerlings disclose frequency modulated video recording circuits. I have noticed that the art does not show a frequency modulated video recorder that can control the video channel balance while reducing noise in order to provide a high fidelity recording.

SUMMARY OF THE INVENTION

To solve the above problems, it is an objective of the present invention to provide a recorder for recording FM-modulated video signal with high resolution.

It is another object to provide an FM video signal recorder that can compensate for an imbalance between channels.

It is yet another object to provide a video signal recorder that prevents noise from flowing into a recording signal.

It is still another object to improve the response characteristics of the components used to process a frequency modulated signal for recording in a video recorder.

To accomplish the above object of the present invention, there is provided a frequency-modulation recording apparatus for recording a frequency modulation video signal having luminance and color components onto a recording medium. The FM recording apparatus has an automatic gain controller for equalizing the level of the FM modulated video signal; a limiter for limiting the level of the luminance components of the FM signal output from the automatic gain controller; a recording equalizer for equalizing the output of the limiter in accordance with the characteristics of the recording medium; a color low-pass filter for filtering and transmitting the color component of the FM modulated video signal output from the automatic gain controller; and a mixer for mixing the luminance component output from the recording equalizer with the color component output from the color low-pass filter.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
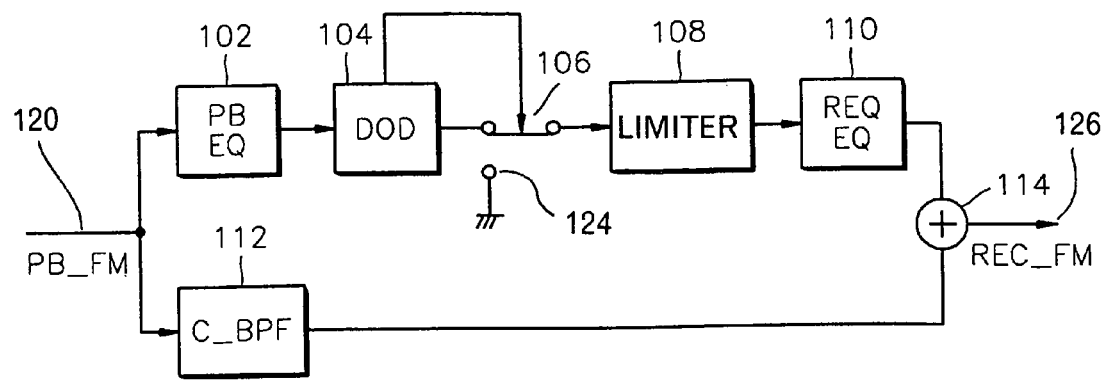
FIG. 1 is a block diagram showing the structure of an FM recording apparatus.

Turning now to the drawings, as seen in FIG. 1 the recording device receives a PB-FM signal 120 and generates a recording FM signal (REC-FM signal) 126. The REC-FM signal 126 is recorded after passing through an equalizer and a recording header (not shown). The apparatus of FIG. 1 includes a playback equalizer 102, a drop out detector (DOD) 104, a switch 106, a limiter 108, a recording equalizer 110, a color band pass filter 112 and a mixer 114.

The playback equalizer 102 equalizes phase characteristics of a PB-FM signal 120, and removes the color component using a color trap. The drop out detector 104 detects the dropped-out portion of the PB-FM signal. The switch 106 switches to ground 124 if the drop out detector 104 detects a dropped-out signal. The reason for this is that the reproducing side can compensate for a signal drop out by a drop out compensator when the recording side does not perform drop out compensation. That is, even if an FM signal that has a dropped-out portion, is recorded, the dropped-out portion is compensated for by a drop out compensator on the reproducing side. Therefore, by setting the dropped-out portion of a signal at ground from the beginning, the drop out compensation can be easily performed on the reproducing side.

The limiter 108 restricts the level of a PB-FM signal to a predetermined level. The recording equalizer 110 equalizes a PB-FM signal supplied from the limiter 108 according to the characteristics of a recording medium.

The color band-pass filter 112 filters and transmits an FM-modulated color component from a PB-FM signal 120. A luminance component from the recording equalizer 110 and a color component from the color band-pass filter 112 are mixed in the mixer 114 and sent to a recording amplifier and a recording head (not shown in drawings) as a recording FM signal (REC-FM signal) 126.

The apparatus of FIG. 1 has a drawback in that the apparatus cannot properly compensate for an imbalance between channels. If there is a difference in the response characteristics of the channel one header (CH1) and the channel two header (CH2), the levels of the signals they reproduce respectively, will be uneven.

In addition, since the switch 106 is located in front of the limiter 108, even if the level of a dropped-out signal goes to ground, noise from the operation of the limiter 108 and the recording equalizer 110 still flows into the mixer 114.

Figure 2:
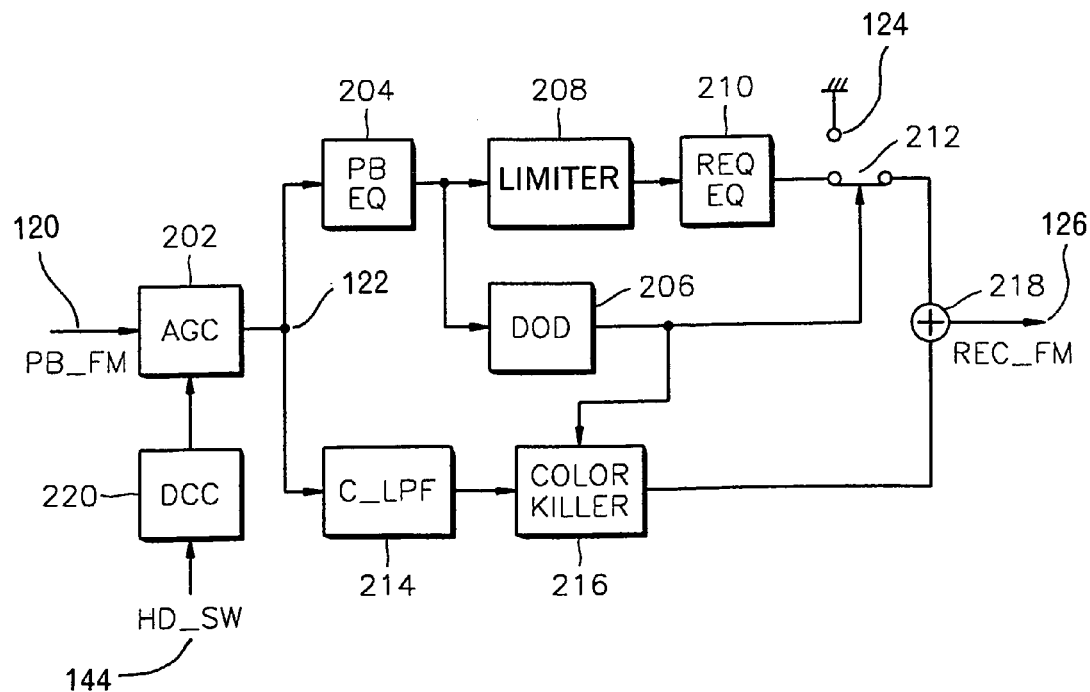
FIG. 2 is a block diagram showing the structure of an FM recording apparatus according to the present invention.

Referring to FIG. 2, the recording apparatus according to the present invention includes an automatic gain controller 202, a playback equalizer 204, a drop out detector 206, a limiter 208, a recording equalizer 210, a switch 212, a color low-pass filter 214, a color killer 216, a mixer 218, and a Direct Chroma Controller 220. The automatic gain controller 202 equalizes the signal level of an input PB-FM signal 120 and evens out a PB-FM signal 120 whose levels are uneven between channels.

Figure 3A:
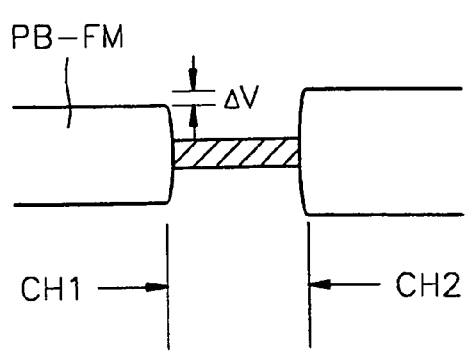
FIGS. 3A and 3B are schematic diagrams showing the operation of the automatic gain controller of FIG. 2.
Figure 3B:
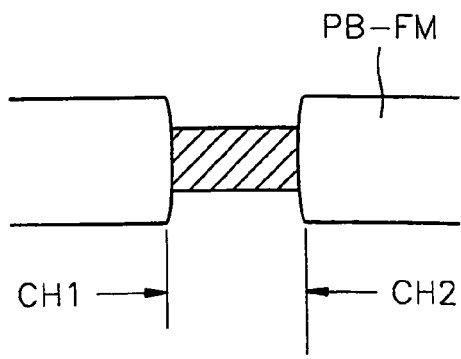

FIG. 3A shows a PB-FM signal input to the automatic gain controller 202, and FIG. 3B shows a PB-FM signal output from the automatic gain controller 202. As shown on the FIG. 3A, a level difference (ΔV) occurs between portions reproduced by channel one (CH1) and by channel two (CH2). This level difference (ΔV) is attributed to a difference in the response characteristics of the CH1 header and the CH2 header. By equalizing the levels of the PB-FM output signal, the automatic gain controller 202 eventually removes any uneven signal level portions. FIG. 3B shows the PB-FM signal output 122 from the automatic gain controller 202 having the same level between channel one CH1 and channel two CH2.

The playback equalizer 204 equalizes the phase characteristics of a PB-FM signal, and removes the color component by the use of a color trap. The limiter 208 limits the level of a PB-FM signal, and the recording equalizer 210 equalizes a PB-FM signal in accordance with the characteristics of recording tapes.

The drop out detector 206 detects the occurrence of a drop out in a PB-FM signal from the playback equalizer 204. If the presence of a dropped-out signal is determined, the switch 212 is switched to ground 124. Since the apparatus of FIG. 2 has a switch 212 positioned after the recording equalizer 208, the apparatus reduces the possible flow of noise into the mixer by removing the limiter 208 and the recording equalizer 210 from the circuit when the switch 212 is grounded 124.

The color low-pass filter 214 filters and transmits the color component of a PB-FM signal, and the color killer 216 removes the color component when a drop out in a PB-FM signal is detected by the drop out detector 206, or when the level of the color component is too low or a monochrome image is recorded.

The mixer 218 mixes and outputs a luminance component and a color component.

The DCC 220 is for reducing the response time of the automatic gain controller 202 and generates an impulse signal synchronized to a head switching pulse.

Referring to the apparatus of FIG. 2, the operation of the automatic gain controller 202 stabilizes after an input signal is approved. That is, the response time of the automatic gain controller 202 is slower than the rising time of an input signal. Therefore, the operation of the automatic gain controller 202 for an FM color signal is not carried out properly. In order to compensate for this, an additional circuit at the back of the automatic gain controller 202 is desired, but the structure of such a circuit would be complicated and burdensome.

In order to solve this problem, the present invention uses a method in which the gain of the automatic gain controller 202 is raised instantaneously the moment an input signal is approved. By doing so, the response time of the automatic gain controller 202 becomes faster, and eventually the operation of automatically controlling the gain of a color signal is improved.

Figure 4:
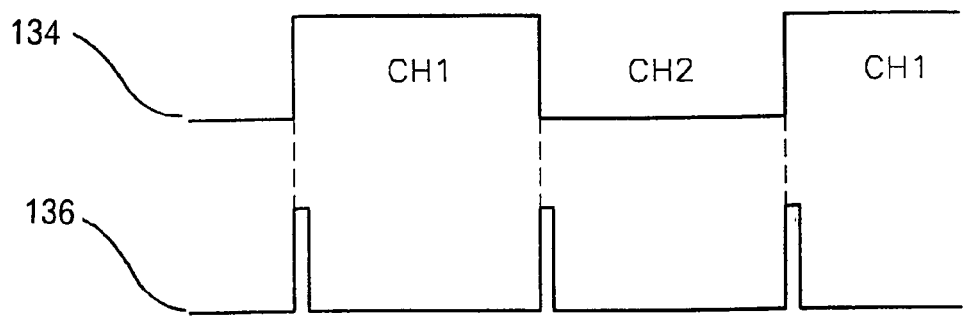
FIG. 4 is a waveform showing the operation of the Direct Chroma Controller (DCC) of FIG. 2.

FIG. 4 is a waveform showing the operation of the Direct Chroma Controller (DCC) 220 of FIG. 2. On the upper part of FIG. 4 is a head switching pulse 134 and on the lower part of FIG. 4 is an impulse signal 136 generated by the DCC 220.

As shown in FIG. 4, the DCC 220 generates impulse signals 136 which coincide with the rising and falling of the head switching pulses 134. The impulse signal 136 is approved to a node which controls the degree of amplification of the automatic gain controller 202, and instantaneously raises the amplification. As a result, the response time of the automatic gain controller 202 in the rising portion and falling portion of an input signal becomes faster.

Figure 5:
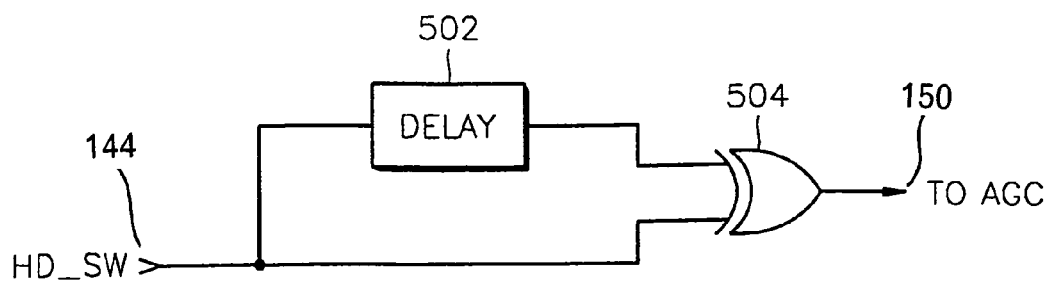
FIG. 5 is a block diagram showing the structure of the DCC of FIG. 3.

Referring to FIG. 5, the DCC 220 includes a delay 502 which delays the head switching signal (HD_SW) 144 to a predetermined time, and an EXCLUSIVE-OR gate 504 which performs an exclusive-or operation on the original head switching signal (HD_SW) 144 and the delayed head switching signal. The output 150 from the exclusive OR operation goes to the automatic gain controller (AGC).

As described above, the FM recorder according to the present invention adopts an automatic gain controller for correcting an imbalance in the PB-FM signal levels of two channels and enables FM recording with superior image. In addition, the FM recorder places a switch for processing a drop out at the back of a recording equalizer, which prevents noise from a limiter and a recording equalizer from flowing into a recording signal. Further, the FM recorder according to the present invention applies a Direct Chroma Controller (DCC), to improve the response characteristics of an automatic gain controller.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A frequency modulation (FM) recording apparatus, comprising:
   an automatic gain controller equalizing a level of a frequency modulated video signal, the frequency modulated video signal having luminance and color components, the frequency modulated video signal being recorded on a recording medium;
   a limiter preventing a level of the luminance components of the frequency modulated signal output from said automatic gain controller from exceeding a predetermined value;
   a recording equalizer equalizing an output of said limiter in accordance with the characteristics of the recording medium; and
   a switch positioned after said recording equalizer, said switch switching to ground when a dropped-out signal is determined in the frequency modulated video signal.

2. The frequency modulation recording apparatus of claim 1, further comprising a color low pass filter separating and transmitting the color component of the frequency modulated signal output from said automatic gain controller.

3. The frequency modulation recording apparatus of claim 1, further comprising:
   a playback equalizer equalizing the phase characteristics of the frequency modulated video signal, and removing the color component by a use of a color trap, said playback equalizer directly connecting said automatic gain controller with said limiter.

4. The frequency modulation recording apparatus of claim 1, with said switch removing said limiter and said recording equalizer when said switch goes to ground.

5. A frequency modulation (FM) recording apparatus, comprising:
   an automatic gain controller equalizing a level of a frequency modulated video signal, the frequency modulated video signal having luminance and color components, the frequency modulated video signal being recorded on a recording medium;
   a limiter preventing a level of the luminance components of the frequency modulated signal output from said automatic gain controller from exceeding a predetermined value;
   a recording equalizer equalizing an output of said limiter in accordance with the characteristics of the recording medium;
   a color low-pass filter filtering and transmitting the color component of the frequency modulated video signal output from said automatic gain controller;
   a mixer combining the luminance component output from said recording equalizer with the color component output from said color low-pass filter;
   a drop out detector recognizing a presence of a signal drop out in the frequency modulated signal output from said automatic gain controller; and
   a switch being positioned between said recording equalizer and said mixer and being controlled by said drop out detector, said switch passing the signal output from said recording equalizer to said mixer if said drop out detector determines that a drop out does not exist and said switch passing a predetermined level signal to said mixer if the drop out detector determines the presence of a drop out.

6. The frequency modulation recording apparatus of claim 5, with the predetermined level being ground.

7. A frequency modulation (FM) recording apparatus, comprising:
   an automatic gain controller equalizing a level of a frequency modulated video signal, the frequency modulated video signal having luminance and color components, the frequency modulated video signal being recorded on a recording medium;
   a limiter preventing a level of the luminance components of the frequency modulated signal output from said automatic gain controller from exceeding a predetermined value;
   a recording equalizer equalizing an output of said limiter in accordance with the characteristics of the recording medium;
   a color low-pass filter filtering and transmitting the color component of the frequency modulated video signal output from said automatic gain controller;
   a mixer combining the luminance component output from said recording equalizer with the color component output from said color low-pass filter; and
   a color killer being placed between said color low-pass filter and said mixer, said color killer terminating a color component if said drop out detector determines a signal drop out.

8. The frequency modulation recording apparatus of claim 7, with said color killer removing the color component when a level of color is below a predetermined value or when a monochrome image is being recorded.

9. A frequency modulation (FM) recording apparatus, comprising:
   an automatic gain controller equalizing a level of a frequency modulated video signal, the frequency modulated video signal having luminance and color components, the frequency modulated video signal being recorded on a recording medium;
   a limiter preventing a level of the luminance components of the frequency modulated signal output from said automatic gain controller from exceeding a predetermined value;
   a recording equalizer equalizing an output of said limiter in accordance with the characteristics of the recording medium;
   a color low-pass filter filtering and transmitting the color component of the frequency modulated video signal output from said automatic gain controller;
   a mixer combining the luminance component output from said recording equalizer with the color component output from said color low-pass filter; and
   a Direct Chroma Controller (DCC) increasing a degree of amplification of said automatic gain controller on a rising part and a falling part of a reproduced frequency modulated signal.

10. The frequency modulation recording apparatus of claim 9, with said Direct Chroma Controller comprising:
    a delay unit receiving a head switching signal and delaying the head switching signal for a predetermined time; and
    an exclusive OR gate performing an exclusive OR operation on the head switching signal and the delayed head switching signal output from the delay, the output from the exclusive OR gate being approved to an amplification control terminal of said automatic gain controller and the degree of amplification of said automatic gain controller being adjusted on both a rising portion and a falling portion of a head switching pulse.

11. The frequency modulation recording apparatus of claim 9, with said direct chroma controller reducing the response time of said automatic gain controller and generating an impulse signal synchronized to a head switching pulse, said direct chroma controller generating impulse signals coinciding with a rising and falling of the head switching pulses, the impulse signal being approved to a node controlling a degree of amplification of said automatic gain controller and instantaneously raising the amplification.

12. A frequency modulation (FM) recording apparatus, comprising:
   an automatic gain controller equalizing a level of a frequency modulated video signal, the frequency modulated video signal having luminance and color components, the frequency modulated video signal being recorded on a recording medium;
   a playback equalizer removing the color component by a color trap and equalizing a phase characteristics of the frequency modulated video signal outputted from said automatic gain controller;
   a drop out detector recognizing a presence of a signal drop out in the frequency modulated signal output from said playback equalizer;
   a limiter preventing a level of the luminance components of the frequency modulated signal output from said playback equalizer from exceeding a predetermined value;
   a recording equalizer equalizing an output of said limiter in accordance with the characteristics of the recording medium;
   a switch removing said limiter and said recording equalizer when said drop out detector detects a presence of the signal drop out in the frequency modulated signal;
   a color low-pass filter filtering and transmitting the color component of the frequency modulated video signal output from said automatic gain controller; and
   a mixer combining the luminance component output from said recording equalizer with the color component output from said color low-pass filter, the removal of said limiter and said recording equalizer by said switch reducing a flow of noise into said mixer.

13. The apparatus of claim 12, with said switch being positioned between said recording equalizer and said mixer and being controlled by said drop out detector, said switch passing the signal output from said recording equalizer to said mixer if said drop out detector determines that a drop out does not exist and said switch passing a predetermined level signal to said mixer if the drop out detector determines the presence of a drop out.

14. The frequency modulation recording apparatus of claim 13, with the predetermined level being ground.

15. The frequency modulation recording apparatus of claim 14, further comprising a color killer being placed between said color low-pass filter and said mixer, said color killer terminating a color component if said drop out detector determines a signal drop out.

16. The frequency modulation recording apparatus of claim 15, with said color killer removing the color component when a level of color is below a predetermined value or when a monochrome image is being recorded.

17. The frequency modulation recording apparatus of claim 16, further comprising a direct chroma controller (DCC) increasing a degree of amplification of said automatic gain controller on a rising part and a falling part of a reproduced frequency modulated signal.

18. The frequency modulation recording apparatus of claim 17, with said direct chroma controller comprising:

a delay unit receiving a head switching signal and delaying the head switching signal for a predetermined time; and
an exclusive OR gate performing an exclusive OR operation on the head switching signal and the delayed head switching signal output from the delay, the output from the exclusive OR gate being approved to an amplification control terminal of said automatic gain controller and the degree of amplification of the automatic gain controller being adjusted on both a rising portion and a falling portion of a head switching pulse.

19. The frequency modulation recording apparatus of claim 18, further comprising a color low pass filter separating and transmitting the color component of the frequency modulated signal output from said automatic gain controller.

20. The frequency modulation recording apparatus of claim 19, with said automatic gain controller instantaneously raising a gain of the inputted frequency modulated video signal when the inputted frequency modulated video signal is approved.

21. The frequency modulation recording apparatus of claim 20, with said direct chroma controller reducing the response time of said automatic gain controller and generating an impulse signal synchronized to a head switching pulse, said direct chroma controller generating impulse signals coinciding with a rising and falling of the head switching pulses, the impulse signal being approved to a node controlling a degree of amplification of said automatic gain controller and instantaneously raising the amplification.

22. A method of processing a frequency modulated (FM) signal for recording, comprising the steps of:
   equalizing a level of a frequency modulated video signal by an automatic gain controller, the frequency modulated video signal having luminance and color components, the frequency modulated video signal being recorded on a recording medium, said automatic gain controller instantaneously raising a gain of the inputted frequency modulated video signal when the inputted frequency modulated video signal is approved;
   removing the color component by a color trap and equalizing a phase characteristics of the frequency modulated video signal outputted from said automatic gain controller by a playback equalizer;
   recognizing a presence of a signal drop out in the frequency modulated signal output from said playback equalizer by a drop out detector;
   preventing a level of the luminance components of the frequency modulated signal output from said playback equalizer from exceeding a predetermined value by a limiter;
   equalizing an output of said limiter in accordance with the characteristics of the recording medium by a recording equalizer;
   removing said limiter and said recording equalizer when said drop out detector detects the presence of the signal drop out in the frequency modulated signal by a switch;
   filtering and transmitting the color component of the frequency modulated video signal output from said automatic gain controller by a color low-pass filter; and
   combining the luminance component output from said recording equalizer with the color component output from said color low-pass filter by a mixer, the removal of said limiter and said recording equalizer by said switch reducing a flow of noise into said mixer.

23. The method of claim 22, with said switch being positioned between said recording equalizer and said mixer and being controlled by said drop out detector, said switch passing the signal output from said recording equalizer to said mixer if said drop out detector determines that a drop out does not exist and said switch passing a ground signal to said mixer if the drop out detector determines the presence of a drop out.

24. The method of claim 23, further comprising the steps of:
placing a color killer between said color low-pass filter and said mixer;
terminating by said color killer the color component of the frequency modulated video signal from said color low-pass filter if said drop out detector determines a signal drop out, said color killer removing the color component when a level of color is below a predetermined value or when a monochrome image is being recorded;
increasing a degree of amplification of said automatic gain controller on a rising part and a falling part of a reproduced frequency modulated signal by a direct chroma controller (DCC); and
a color low pass filter separating and transmitting the color component of the frequency modulated signal output from said automatic gain controller.

25. The method of claim 24, with said step of increasing the degree of amplification of said automatic gain controller by said direct chroma controller, further comprising the steps of:
receiving and delaying a head switching signal by a delay unit, said delay unit delaying the head switching signal for a predetermined time; and
performing an exclusive OR operation on the head switching signal with an exclusive OR gate and the delayed head switching signal output from the delay, the output from the exclusive OR gate being approved to an amplification control terminal of said automatic gain controller and the degree of amplification of the automatic gain controller being adjusted on both a rising portion and a falling portion of a head switching pulse.

26. The method of claim 25, with said direct chroma controller reducing the response time of said automatic gain controller and generating an impulse signal synchronized to a head switching pulse, said direct chroma controller generating impulse signals coinciding with a rising and falling of the head switching pulses, the impulse signal being approved to a node controlling a degree of amplification of said automatic gain controller and instantaneously raising the amplification.

* * * * *